(12) United States Patent
Hafenrichter et al.

(10) Patent No.: US 10,717,162 B2
(45) Date of Patent: Jul. 21, 2020

(54) AUTOMATED APPARATUS FOR MOVING AN END EFFECTOR OVER A SURFACE OF AN AIRFOIL-SHAPED BODY

(71) Applicant: The Boeing Company, Chicago, IL (US)

(72) Inventors: Joseph L. Hafenrichter, Seattle, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 15/834,128

(22) Filed: Dec. 7, 2017

(65) Prior Publication Data

US 2019/0176281 A1    Jun. 13, 2019

(51) Int. Cl.
  *B23Q 9/00*    (2006.01)
  *B23Q 16/00*    (2006.01)
  *B64F 5/60*    (2017.01)
(52) U.S. Cl.
  CPC ......... *B23Q 9/0007* (2013.01); *B23Q 9/0042* (2013.01); *B23Q 16/001* (2013.01); *B64F 5/60* (2017.01)
(58) Field of Classification Search
  CPC ....... B23Q 9/0007; B23Q 16/001; B64F 5/60; G01N 29/225; G01N 29/265; G01N 2291/2694; G01B 5/0002
  USPC .................................................. 414/226.01
  See application file for complete search history.

(56) References Cited

U.S. PATENT DOCUMENTS

| | | |
|---|---|---|
| 4,146,967 A | 4/1979 | Rohner et al. |
| 5,031,458 A | 7/1991 | Young et al. |
| 5,623,107 A | 4/1997 | Patterson, Sr. et al. |
| 5,698,787 A | 12/1997 | Parzuchowski et al. |
| 6,167,760 B1 | 1/2001 | Brunty et al. |
| 6,220,099 B1 | 4/2001 | Marti et al. |
| 6,378,387 B1 | 4/2002 | Froom |
| 6,829,959 B2 | 12/2004 | Gifford et al. |
| 7,083,383 B2 | 8/2006 | Loftus et al. |
| 7,231,826 B2 | 6/2007 | Bossi et al. |

(Continued)

OTHER PUBLICATIONS

MAUS Overview; http://www.boeing.com/defense-space/support/maintenance/commercial/maus.html; 4 pages.

*Primary Examiner* — Saul Rodriguez
*Assistant Examiner* — Brendan P Tighe
(74) *Attorney, Agent, or Firm* — Ostrager Chong Flaherty & Broitman P.C.

(57) ABSTRACT

An automated apparatus comprising: a chassis configured to be mounted on an airfoil-shaped body without contacting its trailing edge; a carriage translatably coupled to the chassis; and an end effector pivotably coupled to the carriage. The chassis comprises: a frame; a motorized drive rolling element rotatably coupled to the frame; a rocker mechanism pivotably coupled to the frame; first and second ball and socket bearings mounted to opposing ends of the rocker arm; and a third ball and socket bearing mounted to the frame. During a maintenance procedure, the airfoil-shaped body is oriented at a non-zero angle of attack with the leading edge higher than the trailing edge and with the balls of the ball and socket bearings in contact with the airfoil-shaped body. A gravitational force exerted urges the chassis toward the trailing edge of the airfoil-shaped body for all chordwise positions of the carriage.

20 Claims, 8 Drawing Sheets

(56) References Cited

U.S. PATENT DOCUMENTS

| | | |
|---|---|---|
| 7,240,556 B2 | 7/2007 | Georgeson et al. |
| 7,315,609 B2 | 1/2008 | Safai et al. |
| 7,337,673 B2 | 3/2008 | Kennedy et al. |
| 7,562,593 B2 | 7/2009 | Engelbart et al. |
| 7,626,383 B1 | 12/2009 | Sun et al. |
| 7,640,811 B2 | 1/2010 | Kennedy et al. |
| 7,716,989 B2 | 5/2010 | Kollgaard |
| 8,483,356 B2 | 7/2013 | Bendahan |
| 8,743,196 B2 | 6/2014 | Fritz et al. |
| 9,302,787 B2 | 4/2016 | Hafenrichter et al. |
| 9,481,082 B1 | 11/2016 | Hafenrichter et al. |
| 9,643,313 B2 | 5/2017 | Hafenrichter et al. |
| 2002/0036108 A1 | 3/2002 | Jeswine et al. |
| 2003/0147493 A1 | 8/2003 | Bueno et al. |
| 2006/0043303 A1 | 3/2006 | Safai et al. |
| 2006/0055396 A1 | 3/2006 | Georgeson et al. |
| 2007/0096727 A1 | 5/2007 | Rempt et al. |
| 2009/0038398 A1 | 2/2009 | Lavoie et al. |
| 2010/0011864 A1 | 1/2010 | Hanan et al. |
| 2010/0132137 A1 | 6/2010 | Eggleston et al. |
| 2011/0178727 A1 | 7/2011 | Hafenrichter et al. |
| 2012/0060611 A1 | 3/2012 | Thommen-Stamenkov et al. |
| 2012/0153032 A1 | 6/2012 | Svanebjerg et al. |
| 2013/0261876 A1 | 10/2013 | Froom et al. |
| 2013/0289766 A1 | 10/2013 | Hafenrichter et al. |
| 2013/0298682 A1 | 11/2013 | Motzer et al. |
| 2013/0304251 A1 | 11/2013 | Garvey et al. |

AUTOMATED APPARATUS FOR MOVING AN END EFFECTOR OVER A SURFACE OF AN AIRFOIL-SHAPED BODY

BACKGROUND

The present disclosure relates generally to the field of automated maintenance (including nondestructive inspection) of aircraft structural elements such as airfoil-shaped bodies, and more particularly to an automated end effector-carrying apparatus that is coupled to and travels along an airfoil-shaped body while performing a maintenance function.

At least one known inspection system includes a frame that is configured to secure to the leading and trailing edges of the airfoil being inspected. More specifically, the frame includes rollers that move along the leading and trailing edges of the airfoil. Additionally, a drive system "drives" either the leading or trailing edge rollers to move the inspection system along the length of the airfoil. However, in operation, the drive rollers may slip off the leading edge as the device traverses along the length of the airfoil requiring the operator to reposition the inspection system on the airfoil.

During the performance of robotic maintenance functions, it would be advantageous to provide an improved design in which the blade crawler does not tend to fall off track when encountering a blade section having a non-constant profile or complex curvature.

SUMMARY

The subject matter disclosed herein is directed to an automated apparatus having devices and employing concepts for maintaining alignment on an airfoil-shaped body, such as a complex-shaped rotor blade. Preferably the automated apparatus comprises: a chassis configured to be mounted on an airfoil-shaped body without contacting its trailing edge; a carriage translatably coupled to the chassis; and an end effector pivotably coupled to the carriage. The chassis comprises: a frame; a motorized drive rolling element rotatably coupled to the frame; a rocker mechanism pivotably coupled to the frame; first and second ball and socket bearings mounted to opposing ends of the rocker arm; and a third ball and socket bearing mounted to the frame. During a maintenance procedure, the airfoil-shaped body is oriented at a non-zero angle of attack with the leading edge higher than the trailing edge and with the balls of the ball and socket bearings in contact with the airfoil-shaped body. A gravitational force exerted urges the chassis toward the trailing edge of the airfoil-shaped body for all chordwise positions of the carriage.

The various embodiments disclosed in detail below enable the automated apparatus (e.g., a blade crawler) to track along a complex-curvature airfoil-shaped body (e.g., a blade component) with twist, camber and sweep. With the ability to track along complex-geometry rotor blades, propellers and other airfoils without loss of functionality, a blade crawler equipped with the devices disclosed hereinafter can provide manufacturing and in-service automated NDI and repair functionality.

The foregoing is furthered or accomplished using one or more of the following devices and concepts: (1) the automated apparatus comprises a chassis that is designed to contact the airfoil-shaped body at or near a leading edge while not contacting the trailing edge (as used herein, the term "chassis" includes a frame, rolling elements rotatably coupled to the frame, and a motor for driving rotation of one or more of the rolling elements); (2) before the start of a maintenance operation, the airfoil-shaped body is inclined at a non-zero angle of attack and the chassis is placed on the airfoil-shaped body with the center of mass of the automated apparatus closer to the leading edge than to the trailing edge of the airfoil-shaped body; (3) during a maintenance operation, the chassis rolls over the surface of the airfoil-shaped body on ball and socket bearings which constrain location without influencing the direction of chassis travel; (4) at least one pair of ball and socket bearings is mounted to a rocker mechanism (pivotably coupled to the chassis frame) that assists the ball and socket bearings to stay in contact with the upper surface of the airfoil-shaped body; (5) at least one pair of ball and socket bearings are spring-loaded to assist the ball and socket bearings to stay in contact with the lower surface of the airfoil-shaped body (as used herein, the term "spring-loaded ball and socket bearing" means a bearing having a ball and a socket operatively coupled by a spring that urges the ball to displace away from the socket); (6) a ball and socket bearing and a drive wheel are mounted to a rocker mechanism (pivotably coupled to the chassis frame) to ensure drive wheel contact for traction; (7) a balance component is provided which is adjustably attachable to the chassis frame for exerting a downward pulling force that increases the stability of the automated apparatus; and (8) the end effector is carried by a flip-flop carriage that travels along an encoder rail mounted to the chassis frame and enables the root and tip of the airfoil-shaped body to be scanned with the same chassis set-up.

One aspect of the subject matter disclosed in detail below is an automated apparatus for moving an end effector over an upper surface an airfoil-shaped body, comprising: a chassis configured to be mounted on the airfoil-shaped body; a first carriage translatably coupled to the chassis; and a first end effector pivotably coupled to the first carriage, wherein the chassis comprises: a frame; a drive cylinder roller rotatably coupled to the frame; a motor mounted to the frame and operatively coupled to cause the drive cylinder roller to rotate; a rocker mechanism pivotably coupled to the frame, the rocker mechanism comprising a rocker arm and a shaft having one end attached to the rocker arm; first and second ball and socket bearings mounted to the rocker arm on opposite sides of the shaft; and a third ball and socket bearing mounted to the frame.

In accordance with one proposed implementation, the frame comprises: a connector beam having opposing ends; an upper cantilever beam having one end connected to one end of the connector beam; a lower cantilever beam having one end connected to another end of the connector beam; a first cross beam supported by and extending in opposite directions away from the connector beam; and a first transverse cantilever beam having one end supported by the upper cantilever beam. In this implementation, the drive cylinder roller is rotatably coupled to the first cross beam, the rocker mechanism is pivotably coupled to the upper cantilever beam, and the third ball and socket bearing is mounted to the first transverse cantilever beam. Optionally, the frame further comprises a second cross beam supported by and extending in opposite directions away from the lower cantilever beam; and the chassis further comprises first and second spring-loaded ball and socket bearings coupled to the second cross beam on opposite sides of the lower cantilever beam.

In accordance with some embodiments, the chassis further comprises a first encoder rail mounted to the upper cantilever beam of the frame, and the first carriage is translatable along the first encoder rail. In addition, the automated apparatus may further comprise a second carriage translatably coupled to the chassis and a second end effector pivotably coupled to the second carriage, wherein the chassis further comprises a second encoder rail mounted to the lower cantilever beam, and the second carriage is translatable along the second encoder rail.

In accordance with a further enhancement, the first carriage is mountable on the upper cantilever beam with first or second orientations that differ by 180 degrees, wherein the first end effector is disposed on one side of the upper cantilever beam when the first carriage is mounted on the upper cantilever beam with the first orientation and is disposed on another side of the upper cantilever beam when the first carriage is mounted on the upper cantilever beam with the second orientation.

In accordance with yet another enhancement, the automated apparatus further comprises a balance component coupled to the frame. The position of the point of coupling of the balance component to the frame is adjustable.

Another aspect of the subject matter disclosed in detail below is an automated apparatus for moving an end effector over an upper surface of an airfoil-shaped body, comprising: a chassis configured to be mounted on the airfoil-shaped body; a carriage translatably coupled to the chassis; and an end effector pivotably coupled to the carriage, wherein the chassis comprises: a frame; a rocker mechanism pivotably coupled to the frame, the rocker mechanism comprising a rocker arm and a shaft having one end attached to the rocker arm; a first ball and socket bearing mounted to the rocker arm on one side of the shaft; a motor mounted to the rocker arm on another side of the shaft; a drive wheel coupled to the motor; and a second ball and socket bearing 2c mounted to the frame 32.

In accordance with another proposed implementation, the frame comprises: a connector beam having opposing ends; an upper cantilever beam having one end connected to one end of the connector beam; a lower cantilever beam having one end connected to another end of the connector beam; and a transverse cantilever beam having one end supported by the upper cantilever beam. In this implementation, the rocker mechanism is pivotably coupled to the upper cantilever beam, and the second ball and socket bearing is mounted to the first transverse cantilever beam. Optionally, the frame further comprises a cross beam supported by and extending in opposite directions away from the lower cantilever beam, and the chassis further comprises first and second spring-loaded ball and socket bearings coupled to the cross beam on opposite sides of the lower cantilever beam.

A further aspect of the subject matter disclosed in detail below is a method for moving an end effector over an upper surface of an airfoil-shaped body having a leading edge and a trailing edge, comprising: (a) coupling the end effector to a carriage to form a carriage-end effector subassembly; (b) coupling multiple ball and socket bearings, a drive rolling element and a motor to a frame to form a chassis, the drive cylinder roller being operatively coupled to rotate when the motor is activated; (c) mounting the carriage of the carriage-end effector subassembly to the chassis to form an assembly; (d) orienting the airfoil-shaped body so that an angle of attack of the airfoil-shaped body is non-zero with the leading edge being at an elevation higher than an elevation of the trailing edge; (e) placing the assembly on the airfoil-shaped body while the airfoil-shaped body has the orientation recited in step (d), the assembly being placed so that the multiple ball and socket bearings and the drive rolling element are in contact with the airfoil-shaped body; and (f) activating the motor to cause the drive rolling element to rotate while the drive rolling element is in contact with the leading edge of the airfoil-shaped body, wherein the chassis is not in contact with the trailing edge of the airfoil-shaped body. A gravitational force exerted on the assembly urges the chassis toward the trailing edge of the airfoil-shaped body for all chordwise positions of the carriage. The foregoing method may further comprise positioning a balance component on or hanging a balance component from a portion of the frame that is disposed underneath the airfoil-shaped body.

Yet another aspect is a method for performing a maintenance function on an airfoil-shaped body having a tip and a root, comprising: (a) coupling an end effector to a carriage to form a carriage-end effector subassembly; (b) coupling multiple ball and socket bearings, a drive rolling element and a motor to a frame to form a chassis, the drive rolling element being operatively coupled to rotate when the motor is activated; (c) placing the chassis on the airfoil-shaped body so that the multiple ball and socket bearings and the drive rolling element are in contact with the airfoil-shaped body; (d) mounting the carriage-end effector subassembly to the chassis with a first orientation; (e) moving the chassis toward a root of the airfoil-shaped body; (f) operating the end effector to interact with a portion of the airfoil-shaped body in a vicinity of the root of the airfoil-shaped body; (g) removing the carriage-end effector subassembly from the chassis; (h) mounting the carriage-end effector subassembly to the chassis with a second orientation that differs from the first orientation by 180 degrees; (i) moving the chassis toward a tip of the airfoil-shaped body; and (j) operating the end effector to interact with a portion of the airfoil-shaped body in a vicinity of the tip of the airfoil-shaped body.

Other aspects of automated apparatus for moving a maintenance tool along an aircraft structural element such as an airfoil-shaped body (e.g., a rotor blade) are disclosed below.

BRIEF DESCRIPTION OF THE DRAWINGS

Reference will hereinafter be made to the drawings in which similar elements in different drawings bear the same reference numerals.

DETAILED DESCRIPTION

For the purpose of illustration, systems and methods for performing automated maintenance operations on an airfoil-shaped body will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, the term "maintenance" includes, but is not limited to, operations such as non-destructive inspection (NDI), drilling, scarfing, grinding (e.g., to remove bonded or bolted components), fastening, appliqué application, ply mapping, depainting, cleaning and painting. Any one of a multiplicity of end effectors for performing a respective one of the foregoing maintenance functions can be attached to the apparatus. There are a number of types of blade components on aircraft that will benefit from maintenance automation, including rotorcraft blades, propeller blades, flaps, ailerons, trim tabs, slats, stabilators and stabilizers. As a whole, the automated apparatus reduces maintenance time, labor hours and human errors when robotic maintenance functions are performed on blade components. Please put the definitions/benefits in the specification As used herein, the term "airfoil-shaped body" refers to a body having a leading edge and a trailing edge connected by upper and lower aerodynamic surfaces (such as the blade components identified in the next paragraph). As used herein, the term "leading edge" is the point at the front of the airfoil-shaped body that has maximum curvature (minimum radius). As used herein, the term "trailing edge" is defined similarly as the point of minimum curvature at the rear of the airfoil-shaped body. As used herein, the term "chord" refers to an imaginary line that extends from the leading edge to the trailing edge (e.g., an imaginary line that is perpendicular to another imaginary line that is parallel to the spanwise direction of the airfoil-shaped body).

Figure 1:
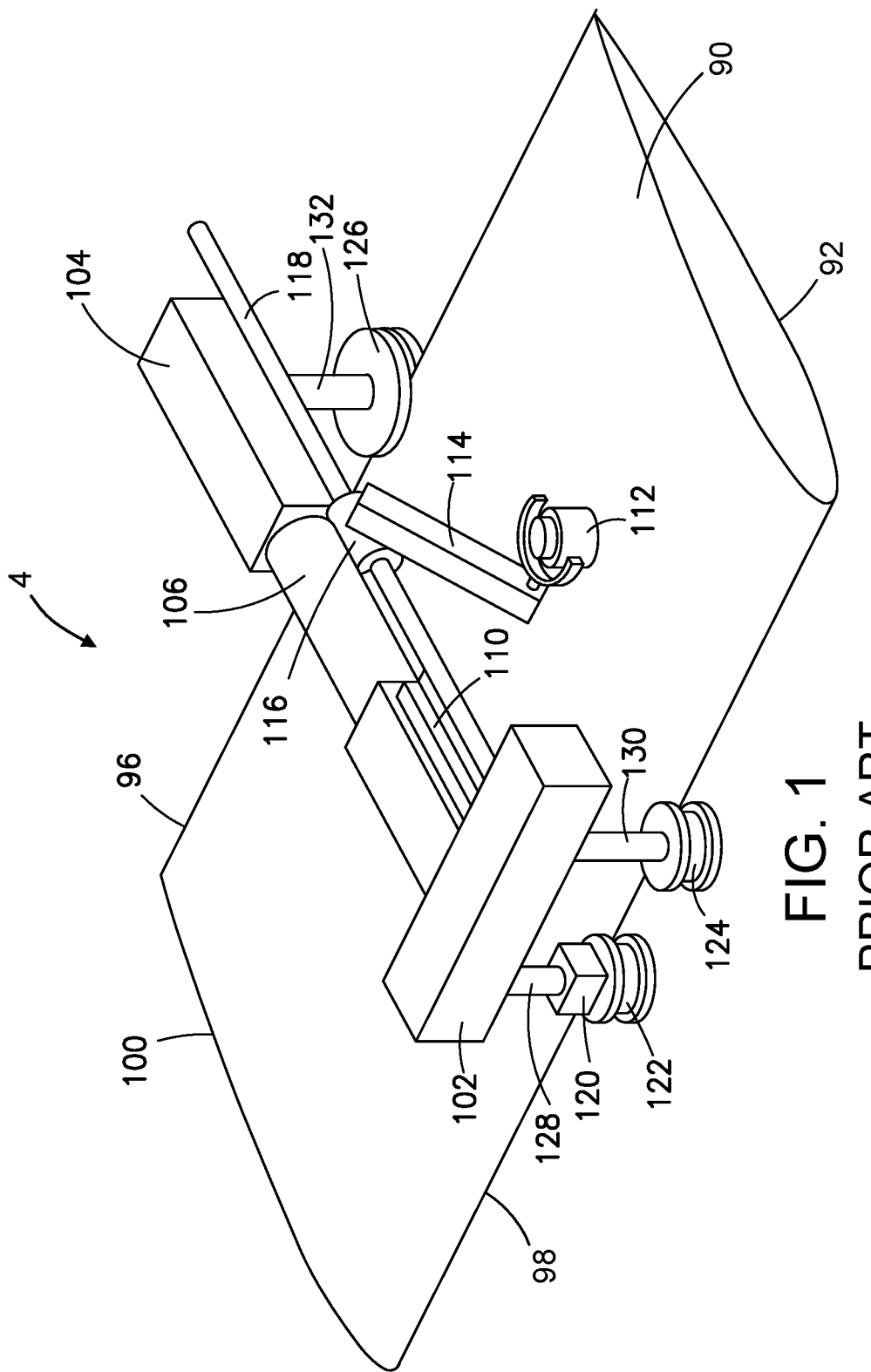
FIG. 1 is a diagram representing an orthographic view of an automated apparatus having a drive roller and a follower wheel and carrying an end effector, the crawler being mounted on an airfoil-shaped body having a short chord length.

FIG. 1 shows one design for an autonomous, self-propelled, expandable and adjustable apparatus (hereinafter "automated apparatus 4") for inspecting in-service airfoil-shaped bodies such as rotorcraft blades, aircraft propellers, smaller winglets, and narrow tail sections for structural damage by crawling along the length of an airfoil-shaped body 100 using the leading edge 98 and trailing edge 96 as the tracks, and employing scanning sensor mechanisms to acquire data representing the structural conditions found as the automated apparatus 4 moves across an upper surface 90 of the airfoil-shaped body 100. The lower surface 92 of the airfoil-shaped body 100 can be scanned by placing the automated apparatus 4 upside-down on the airfoil-shaped body 100.

As seen in FIG. 1, the automated apparatus 4 comprises a forward body part 102, a rearward body part 104, and an intercostal element 106 that interconnects the forward and rearward body parts 102, 104 to form a chassis. One of the forward and rearward body parts 102, 104 is displaceable along an axis of the intercostal element 106 to facilitate adjustment of the distance separating the forward and rearward body parts 102, 104, while the other body part is fixed relative to the intercostal element 106.

The forward body part 102 is positioned near a leading edge 98 of an airfoil-shaped body 100 and the rearward body part 104 is positioned near a trailing edge 96 of the airfoil-shaped body 100. A maintenance operation is carried out by an end effector 112 pivotally mounted on one end of an arm 114. The other end of the arm 114 is pivotally mounted to a slider 116 coupled to and slidable on a guide rod 118. The guide rod 118 is integrally formed with a mounting plate 110 that is fastened to the forward body part 102. To translate the end effector 112 chordwise across the upper surface 90 of the airfoil-shaped body 100, a motor (not shown in FIG. 1) encased within the slider 116 interacts with the guide rod 118 via gears or friction wheels. Alternatively, the chordwise motion may be achieved by positioning the motor on the forward body part 102 and translating the slider 116 via a cable, drive belt, chain, or screw-drive in a well-known manner.

The forward body part 102 has a first rod 128 depending therefrom on which a control motor 120 is mounted. A drive roller 122 is mounted to an output shaft of the control motor 120. Rotation of drive roller 122 causes the automated apparatus 4 to travel in a spanwise direction provided that the drive roller 122 does not slip relative to the leading edge 98 of the airfoil-shaped body 100. The forward body part 102 also has a second rod 130 depending therefrom on which a secondary follower wheel 124 is rotatably mounted. The secondary follower wheel 124 is displaced spanwise from the drive wheel 122 as shown.

Still referring to FIG. 1, a shaft 132 depends from a rotary encoder (not shown) housed within the rearward body part 104 and carries a follower encoder wheel 126 on the free end thereof. The spanwise position of the crawler is measured by the rotary encoder, which encodes rotation of encoder wheel 126. The encoder wheel 126 rides on the trailing edge 96 as the crawler travels in the spanwise direction. The rotary encoder sends respective encoder pulses to an operations control center (e.g., via an encoder cable or a wireless connection) after each incremental movement of crawler in the spanwise direction.

When the automated apparatus 4 reaches a target spanwise position, a control computer (not shown in FIG. 1)

shuts off the control motor 120 and then starts an end effector scan drive motor (not shown), e.g., a drive motor which moves slider 116 along the guide rod 118 seen in FIG. 1. The computer system is programmed to control the end effector scan drive motor in dependence on the end effector chordwise-position information derived from pulses generated by an end effector position encoder (not shown). In cases where the end effector is a rotary tool (such as a scarfer, drill, deburrer or reamer), when the rotary tool reaches a target chordwise position, the control computer shuts off the end effector scan drive motor and then starts an end effector motor (not shown), e.g., a drive motor which drives rotation of the rotary tool.

Figure 2:
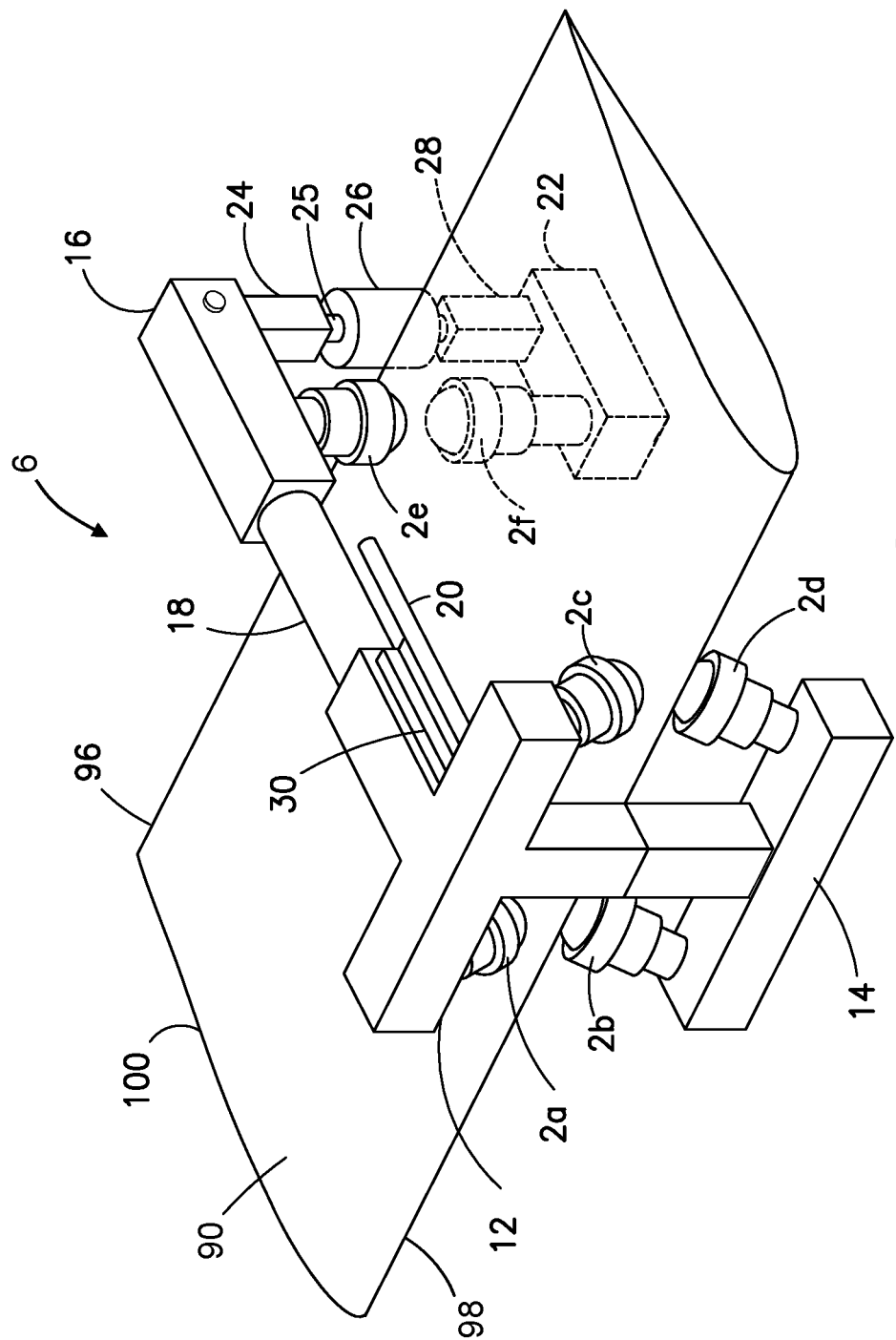
FIG. 2 is a diagram representing an orthographic view showing some components of an automated apparatus having a plurality of ball and socket bearings for maintaining alignment on an airfoil-shaped body. The end effector for performing a maintenance function and the means for scanning that end effector in a chordwise direction are not shown to avoid clutter in the drawing.

The alignment and movement of automated blade crawlers of the type shown in FIG. 1 can be enhanced by the addition of devices able to track complex-geometry rotor blades, propellers and other airfoil-shaped bodies. FIG. 2 shows portions of an automated apparatus 6 having a plurality of ball and socket bearings 2a through 2f for maintaining alignment on an airfoil-shaped body 100. The chassis of the automated apparatus 6 comprises an upper forward body part 12, an upper rearward body part 16, and an intercostal element 18 that interconnects the upper forward and rearward body parts in the manner previously described with reference to FIG. 1. A pair of ball and socket bearings 2a and 2c are mounted to the upper forward body part 12, while a ball and socket bearing 2e is mounted to the upper rearward body part 16.

The end effector for performing a maintenance function and the means for scanning that end effector in a chordwise direction are not shown in FIG. 2, except for a portion of a guide rod 20 integrally formed with a mounting plate 30 that is fastened to the upper forward body part 12. In particular, the slider which slides on the guide rod 20 and carries the end effector is not shown. Also, a drive roller and a follower roller in contact with the leading edge of the airfoil-shaped body 100 and a drive motor for driving rotation of the drive roller (similar to elements 120, 122 and 124 shown in FIG. 1) are not shown in FIG. 2 to reduce clutter in the drawing. However, it should be understood that the embodiment shown in FIG. 2 comprises at least one drive motor/drive roller for self-propulsion and means for scanning an end effector in a chordwise direction even though such components are not shown.

Still referring to FIG. 2, the chassis of the automated apparatus 6 also comprises a lower forward body part 14 which is telescopically coupled to the upper forward body part 12 for manually adjusting the vertical distance separating opposing horizontal arms of the upper and lower forward body parts during mounting of the crawler on the airfoil-shaped body 100. A pair of ball and socket bearings 2b and 2d are mounted to the lower forward body part 14. The vertical distance separating opposing horizontal arms of the upper and lower forward body parts will be selected so that the opposing pairs of ball and socket bearings 2a-2b and 2c-2d respectively contact the upper and lower surfaces of the airfoil-shaped body 100. When the horizontal arms of the upper and lower forward body parts are separated by an optimum vertical distance, a set screw or other locking means can be used to prevent further relative movement of the upper and lower forward body parts during crawler operation. Optionally, each of ball and socket bearings 2a-2d may be coupled to the upper and lower forward body parts and may include a respective internal compression spring for urging ball and socket bearings 2a-2d toward the respective surfaces of the airfoil-shaped body 100.

The chassis of automated apparatus 6 further comprises a lower rearward body part 22 which supports a ball and socket bearing 2f (both of which are drawn using dashed lines to indicate they are below and hidden from view by the airfoil-shaped body 100). Preferably ball and socket bearing 2f opposes ball and socket bearing 2e, which is mounted to upper rearward body part 16. Optionally, ball and socket bearings 2e and 2f may be coupled to the upper and lower rearward body parts respectively and may include a respective internal compression spring for urging ball and socket bearings 2e and 2f toward the upper and lower surfaces respectively of airfoil-shaped body 100.

The ball and socket bearings 2a-2f enable motion of the automated apparatus 6 along complex-shaped blades (i.e., in a spanwise direction) without causing misdirection. The ball and socket bearings can be similar to any one of a plurality of commercially available types of ball and socket bearings. When ball and socket bearings are used instead of alignment wheel, a nearly frictionless omni-directional alignment device is provided.

The lower rearward body part 22 depends from the upper rearward body part 16. The upper and lower rearward body parts are connected by an assembly comprising an upper axle support 24 connected to upper rearward body part 16, a lower axle support 28 connected to lower rearward body part 22, and an axle 25 whose opposing ends are supported by the upper and lower axle supports so that the axis of axle 25 is generally vertical. The vertical separation between the two rearward body parts may be adjustable by any conventional means.

Still referring to FIG. 2, a roller 26 is rotatably mounted on axle 25. The roller 26 is in contact with and rolls along the trailing edge 96 of the airfoil-shaped body 100. In one implementation, roller 26 comprises a roller bearing having an inner race attached to axle 25 and an outer race rotatable relative to the inner race. However, in cases where the airfoil-shaped body 100 has protrusions (such as trim tabs) on its trailing edge 96, additional mechanisms for enabling the roller 26 to travel over those protrusions add complexity to the design of the apparatus.

Figure 3:
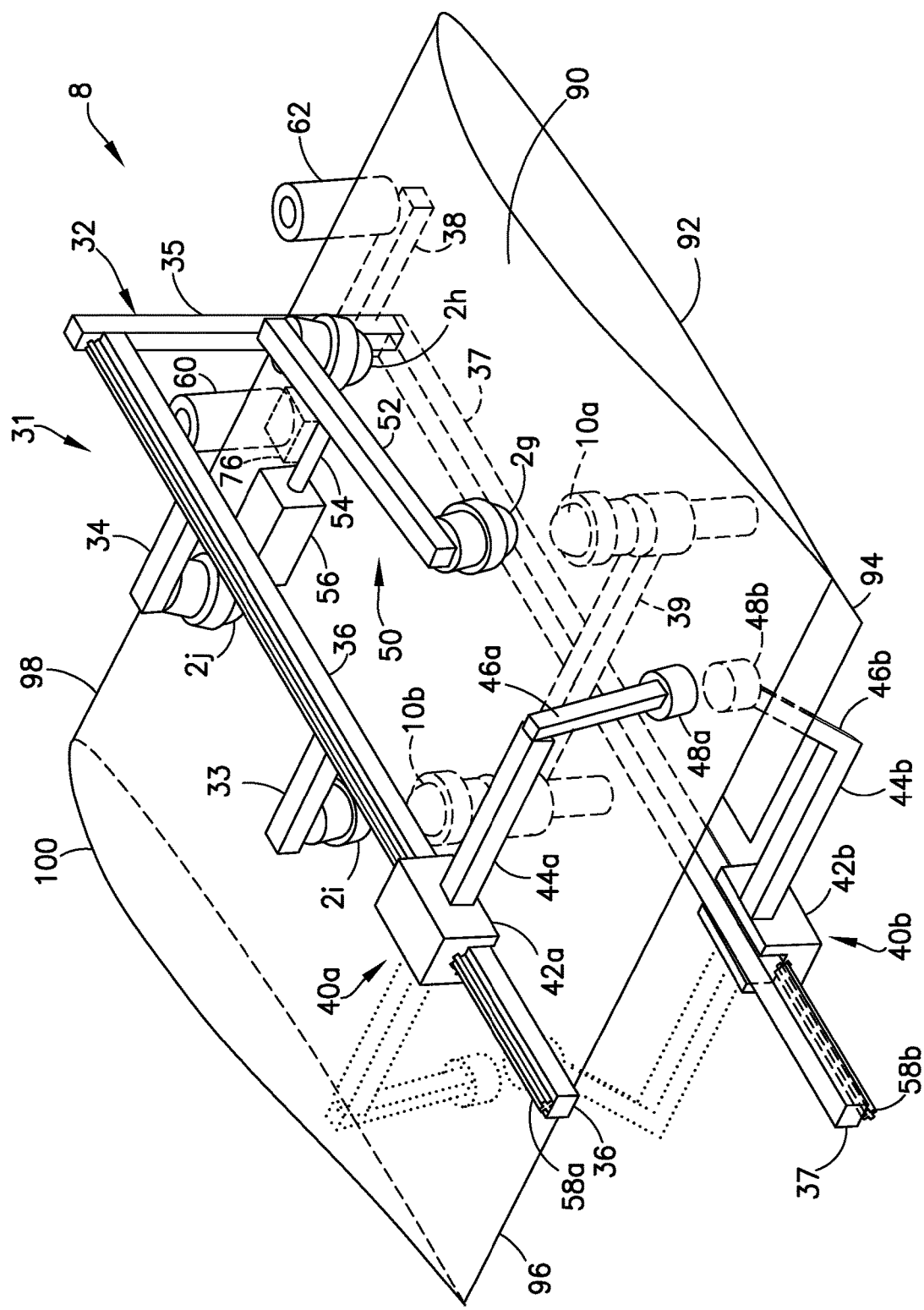
FIG. 3 is a diagram representing an orthographic view of an automated apparatus mounted on an airfoil-shaped body for performing a maintenance operation in accordance with a first embodiment.

To forestall any tendency of the automated apparatuses 4 and 6 respectively depicted in FIGS. 1 and 2 toward off-track driving caused by traditional drive wheels and trailing edge attachment, additional enhancements may be provided. These enhancements enable the automated apparatus to better track along a complex-curvature blade component with twist, camber and sweep. FIG. 3 is a diagram representing an orthographic view of one such enhanced automated apparatus 8 mounted on an airfoil-shaped body 100 for performing a maintenance operation in accordance with a first embodiment. The automated apparatus 8 for moving an end effector 48a over an upper surface 90 of the airfoil-shaped body 100 comprises: a chassis 31 configured to be mounted on the airfoil-shaped body 100; a first carriage-end effector subassembly 40a translatably coupled to the chassis 31; and a second carriage-end effector subassembly 40b translatably coupled to the chassis 31. More specifically, the first carriage-end effector subassembly 40a comprises a first carriage 42a translatably coupled to the chassis 31, a transverse arm 44a having one end affixed to the first carriage 42a, a pivotable arm 46a having one end pivotably coupled to the other end of the transverse arm 44a, and a first end effector 48a pivotably coupled to the other end of the pivotable arm 46a. Similarly, the second carriage-end effector subassembly 40a comprises a second carriage 42b translatably coupled to the chassis 31, a transverse arm 44b having one end affixed to the second carriage 42b, a pivotable arm 46b having one end pivotably coupled to the other end of the transverse arm 44b, and a second end effector 48b pivotably coupled to the other end of the pivotable arm 46b. During a maintenance procedure, the first end effector 48a will be disposed in proximity to, if not in contact with, the upper surface 90 of the airfoil-shaped body 100, while the second end effector 48b will be disposed in proximity to, if not in contact with, the lower surface 92 of the airfoil-shaped body 100. This arrangement enables the performance of maintenance operations concurrently on both sides of the airfoil-shaped body 100. The automated apparatus 8 is configured so that it does not contact any protrusion on the trailing edge 96, such as trim tab 94.

In accordance with the embodiment depicted in FIG. 3, the chassis 31 comprises: (a) a frame 32; (b) a drive cylinder roller 60 rotatably coupled to the frame 32 and positioned to contact and be in traction with the leading edge 98 of the airfoil-shaped body 100; (c) a motor 76 mounted to the frame 32 and operatively coupled to cause the drive cylinder roller 60 to rotate; (d) a rocker mechanism 50 pivotably coupled to the frame 32, the rocker mechanism comprising a rocker arm 52 and a shaft 54 having one end attached to the rocker arm 52 and another end rotatably seated in a bearing 56; (e) first and second ball and socket bearings 2g, 2h mounted to the rocker arm 52 on opposite sides of the shaft 54; and (f) a third ball and socket bearing 2i mounted to the frame 32.

In accordance with the embodiment depicted in FIG. 3, the frame 32 comprises: a connector beam 35 having opposing ends; an upper cantilever beam 36 having one end connected to one end of the connector beam 35; a lower cantilever beam 37 having one end connected to another end of the connector beam 35; a first cross beam 38 supported by and extending in opposite directions away from the connector beam 35; and a first transverse cantilever beam 33 having one end supported by the upper cantilever beam 36. The drive cylinder roller 60 is rotatably coupled to the first cross beam 38. The rocker mechanism 50 is pivotably coupled to the upper cantilever beam 36. The third ball and socket bearing 2i is mounted to the first transverse cantilever beam 33. Optionally, the frame 32 further comprises a second transverse cantilever beam 34 having one end supported by the upper cantilever beam 36. In this implementation, the chassis 31 further comprises a fourth ball and socket bearing 2j mounted to the second transverse cantilever beam 34. The chassis 31 further comprises a follower cylinder roller 62 rotatably coupled to the first cross beam 38 and positioned to roll along the leading edge 98 of the airfoil-shaped body 100.

Still referring to FIG. 3, the frame 32 further comprises a second cross beam 39 supported by and extending in opposite directions away from the lower cantilever beam 37. In this implementation, the chassis 31 further comprises first and second spring-loaded ball and socket bearings 10a, 10b coupled to the second cross beam 39 on opposite sides of the lower cantilever beam 37.

As seen in FIG. 3, the chassis 31 further comprises a first encoder rail 58a mounted to the upper cantilever beam 36 of the frame 32 and a second encoder rail 58b mounted to the lower cantilever beam 37 of the frame 32. The first carriage 42a is translatable along the first encoder rail 58a, while the second carriage 42b is translatable along the second encoder rail 58b. Optionally, the first carriage 42a is mountable on the upper cantilever beam 36 with either a first orientation (indicated by solid lines in FIG. 3) or a second orientation (indicated by dotted lines in FIG. 3) that differs from the first orientation by 180 degrees, wherein the first end effector 48a is disposed on one side of the upper cantilever beam 36 when the first carriage 42a is mounted on the upper cantilever beam 36 with the first orientation and is disposed on another side of the upper cantilever beam 36 when the first carriage 42a is mounted on the upper cantilever beam 36 with the second orientation. The orientation of the second carriage 42b on the lower cantilever beam 37 can be reversed in a similar manner. The ability to flip-flop the first and second carriage-end effector subassemblies 40a, 40b allows the automated apparatus 8 to be used to alternatingly perform maintenance operations on both the blade tip side and blade root side of the chassis spine formed by the connecting beam 35 and upper and lower cantilever beams 36 and 37.

The automated apparatus 8 depicted in FIG. 3 is designed to be placed on the airfoil-shaped body 100 while the latter is oriented with a non-zero angle of attack and with the leading edge 98 at an elevation higher than an elevation of the trailing edge 96. The chassis 31 is designed to not contact the trailing edge 96 of the airfoil-shaped body 100 during operation. This can be accomplished by providing a chassis 31 having an open end as seen in FIG. 3 or having a second closed end that is separated from the trailing edge 96 while the first closed end of the chassis 31 is in contact with the leading edge 98. In addition, the automated apparatus 8 is placed so that the multiple ball and socket bearings 2a-2c and the drive cylinder roller 60 are in contact with surfaces of the airfoil-shaped body 100. A motor (not shown in FIG. 3, but see motor 76 in FIG. 7) is activated to cause the drive cylinder roller 60 to rotate while the latter is in contact with the leading edge 98 of the airfoil-shaped body 100.

Figure 4:
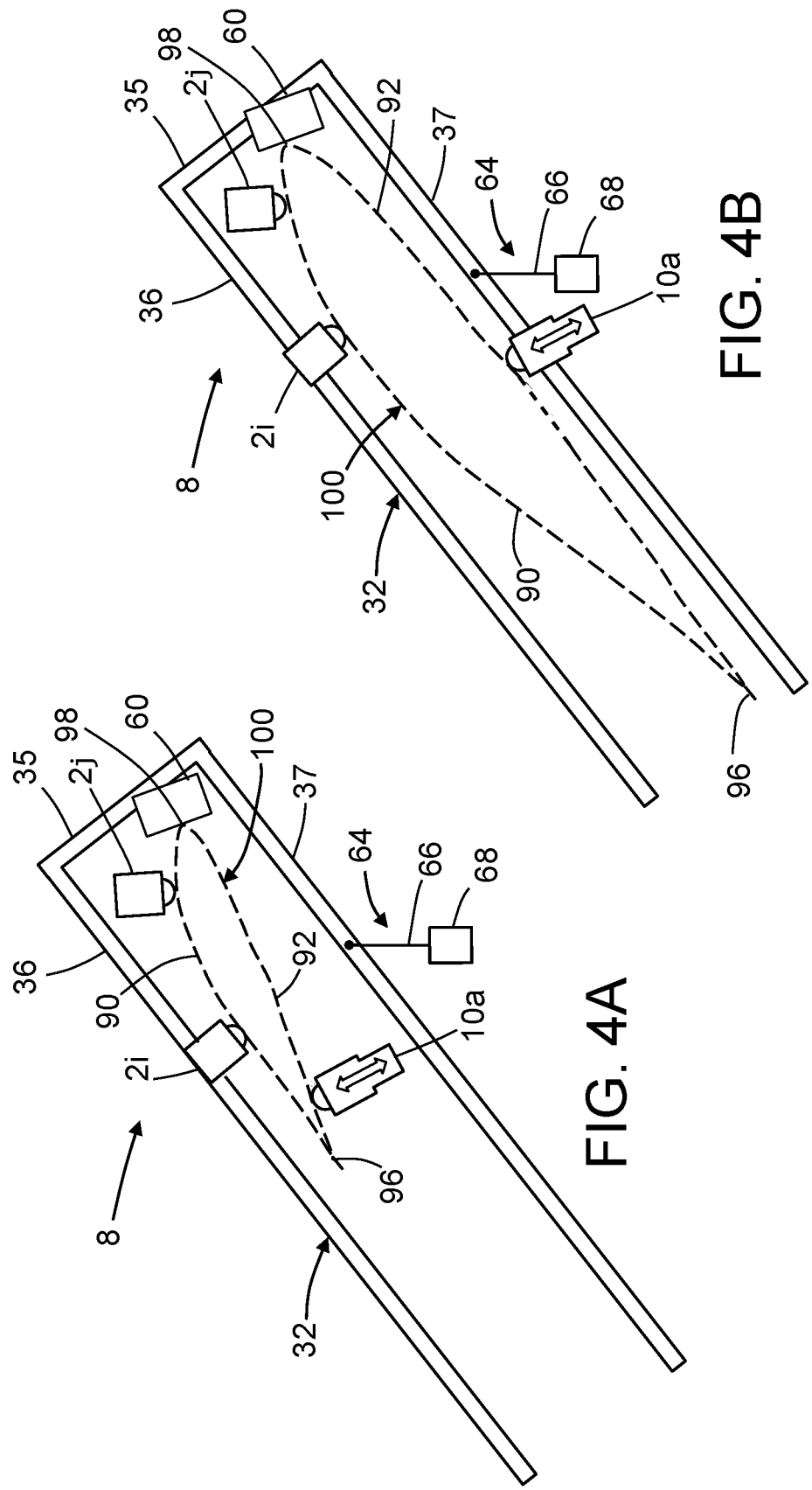
FIGS. 4A and 4B are diagrams showing some components of an adjustable automated apparatus for performing a maintenance operation which can be mounted on airfoil-shaped bodies having different chord profiles. In this embodiment, the automated apparatus has a drive cylinder roller at the leading edge of the airfoil-shaped body.

FIGS. 4A and 4B are diagrams showing some components of an automated apparatus 8 that is reconfigurable to enable maintenance operations on respective airfoil-shaped bodies 100 having different chord profiles. During setup, the airfoil-shaped body 100 is rotated about its pitch axis so that it has a non-zero angle of attack with its leading edge 98 at an elevation which is higher than the elevation of the trailing edge 96. In the scenarios depicted in FIGS. 4A and 4B, the drive cylinder roller 60 is in contact with the leading edge 98 of the airfoil-shaped body 100. Preferably the center of mass of the automated apparatus 8 is located such that a gravitational force exerted on the automated apparatus 8 urges the chassis 31 toward the trailing edge 96 of the airfoil-shaped body 100 for all chordwise positions of the carriage 42a.

The balls of the spring-loaded ball and socket bearings 10a and 10b (only spring-loaded ball and socket bearing 10a is visible in FIGS. 4A and 4B) are displaceable to enable ball contact with respective lower surfaces 92 on the airfoil-shaped bodies 100 having different chord profiles. If the positional adjustment needed is greater than the stroke of the displaceable balls, then the ball and socket bearings 10a and 10b can be designed to be adjustably coupled along respective rails (not shown) that extend from the cross beam 39. The respective positions of the ball and socket bearings 10a and 10b along those rails can be selected so that the balls are in contact with the lower surface 92 of the airfoil-shaped body 100. In one alternative embodiment, each of the ball-and-socket bearings 10a and 10b may be mounted to the end of a respective extendible/retractable plunger (not shown) of a respective electromechanical solenoid 88 (see FIG. 7), which solenoids 88 are used to actuate engagement of the ball-and-socket bearings 10a and 10b with the lower surface 92 of the airfoil-shaped body 100. In other alternative embodiments, other types of actuators for extending/retracting the ball-and-socket bearings 10a and 10b can be utilized.

To ensure that the automated apparatus 8 is stably mounted to the airfoil-shaped body 100, an adjustment mechanism can be provided in the form of a balance component 64. In accordance with the embodiments depicted in FIGS. 4A and 4B, the balance component 64 comprises a relatively stiff cord 66 (or a rigid rod) having one end affixed to the lower cantilever beam 37 of the frame 32 and a mass 68 attached to the opposite end of the cord 66. The balance component 64 can be suspended from the lower cantilever beam 37 of the frame 32 at a selectable chordwise position (e.g., forward of the spring-loaded ball and socket bearing 10a) such that the resulting gravitational force exerted on the automated apparatus 8 has a vector component that urges the balls of the ball and socket bearings 2i and 2j against the upper surface 90 of the airfoil-shaped body 100. The position of the point at which the mass 68 is coupled to the frame 32 can be varied in a chordwise direction to produce the desired stabilizing effect. Ideally the balance component 64 is connected at the point where it pulls in a location coinciding with the vector pointing directly downward from the center of mass of the apparatus. Preferably, during a maintenance operation (e.g., a nondestructive inspection procedure), the balance component 64 is rigidly coupled to the lower cantilever beam 37 of the frame 32 in a manner that does not allow the balance component 64 to swing or oscillate in the wind.

Optionally, the balance component may be mounted on and slidable along the lower cantilever beam 37, in which case the balance component 64 would be lockable in place after sliding.

In accordance with an alternative embodiment, the balance component may take the form of an umbilical cable (not shown in the drawings) that provides electrical power, digital data, vacuum pressure, pressurized air, or acoustic couplant to the automated apparatus 8 or returns NDI sensor data to a computer system on the ground. An intermediate portion of such an umbilical cable may be attached to the lower cantilever beam 37 for exerting a downward force on the frame 32 as previously described.

Figure 5:
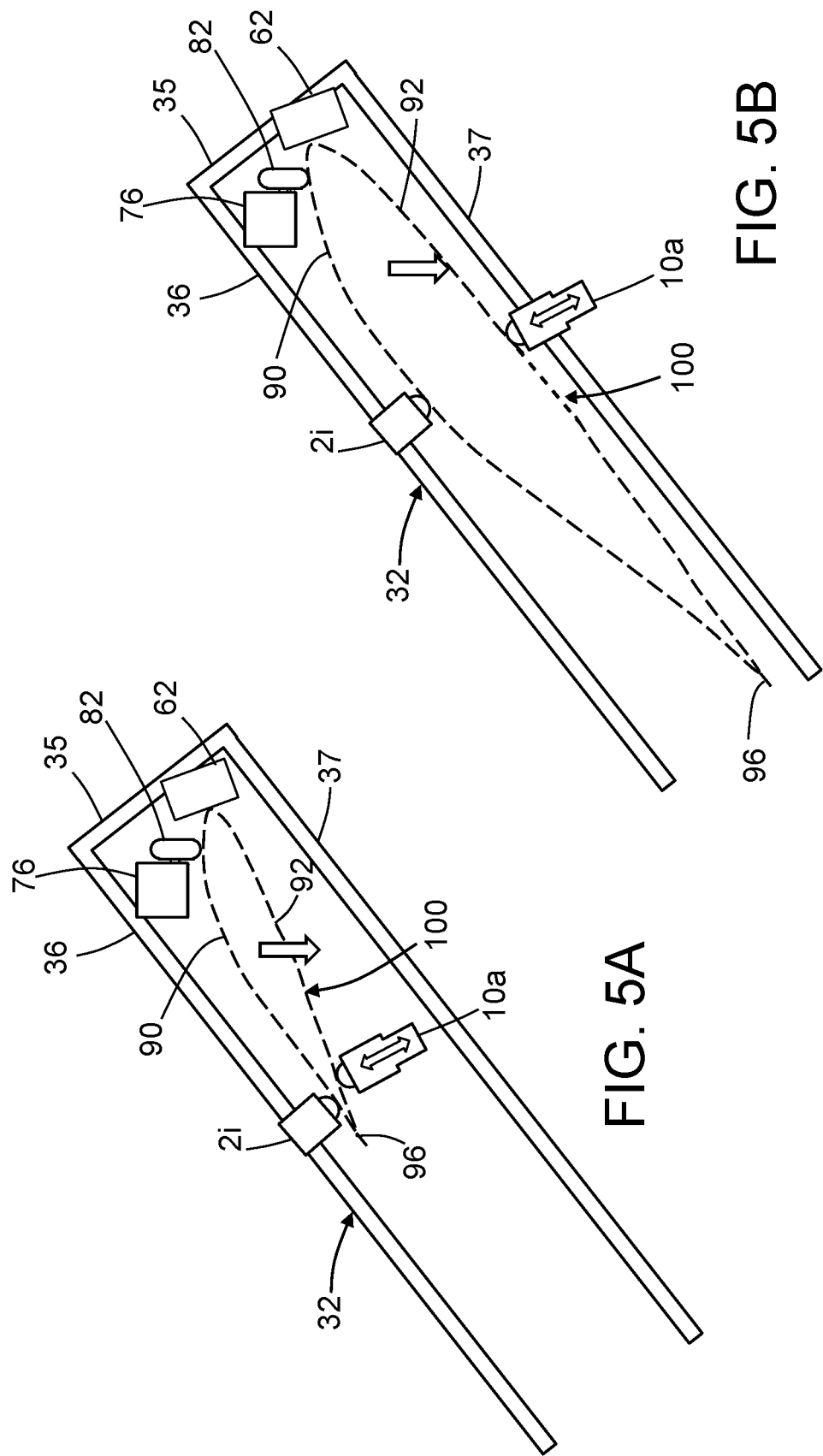
FIGS. 5A and 5B are diagrams showing some components of an adjustable automated apparatus for performing a maintenance operation which can be mounted on airfoil-shaped bodies having different chord profiles in accordance with an alternative embodiment. In this embodiment, the automated apparatus has a drive wheel in contact with the upper surface of the airfoil-shaped body in proximity to the leading edge and has a follower cylinder roller at the leading edge.

FIGS. 5A and 5B are diagrams showing some components of an adjustable automated apparatus for performing a maintenance operation which can be mounted on airfoil-shaped bodies 100 having different chord profiles in accordance with an alternative embodiment. Instead of a drive cylinder roller 60 in contact with the leading edge 98, this embodiment has a drive wheel 82 in contact with the upper surface 90 of the airfoil-shaped body 100 in proximity to the leading edge 98. The drive wheel 82 is mounted to the output shaft of a stepper motor 76, which is mounted to the upper cantilever beam 36 of the frame 32. As in the previous embodiments, this automated apparatus also has a follower cylinder roller 62 in contact with the leading edge 98 of the airfoil-shaped body 100.

Figure 6:
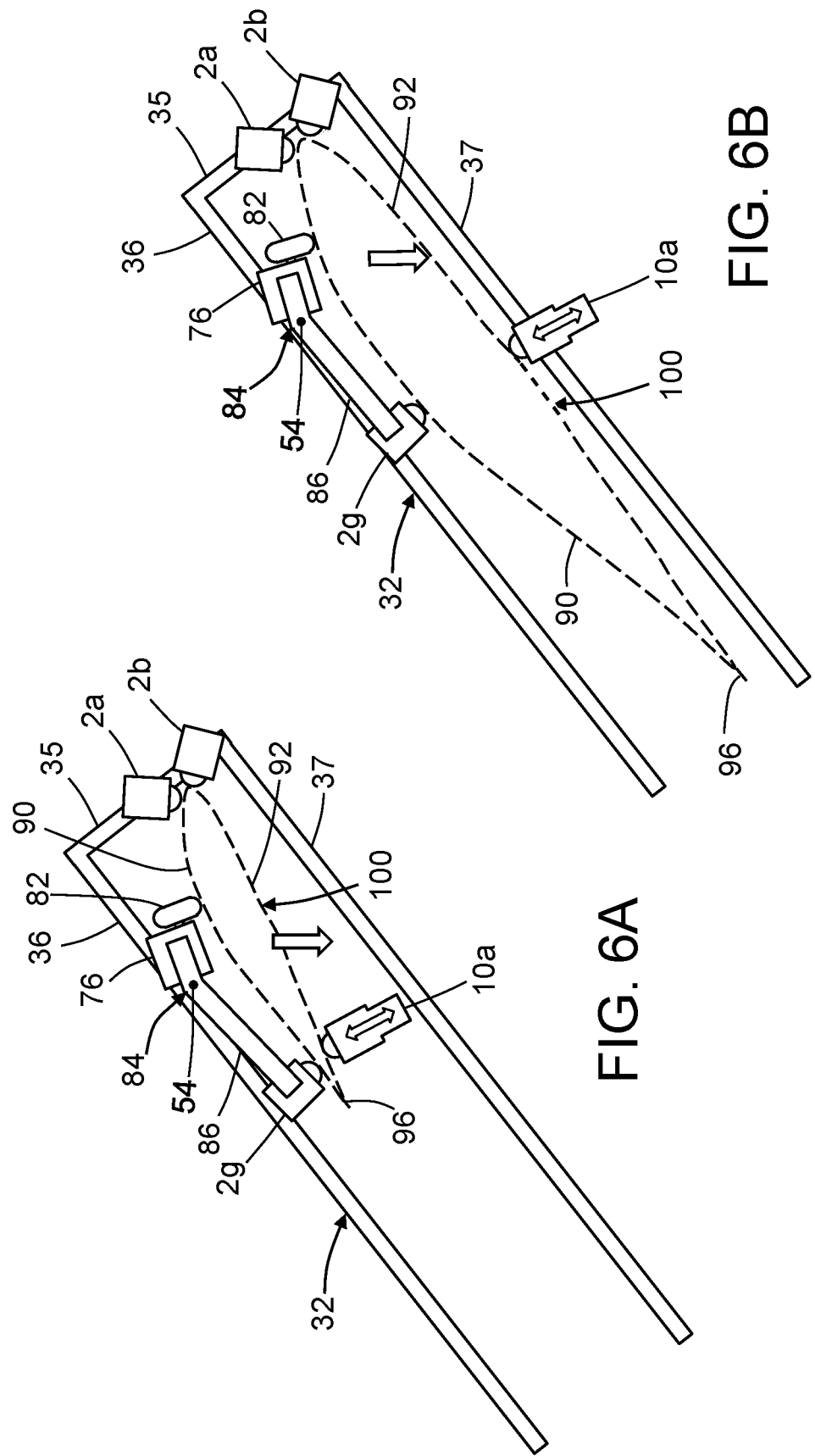
FIGS. 6A and 6B are diagrams showing some components of an adjustable automated apparatus for performing a maintenance operation which can be mounted on airfoil-shaped bodies having different chord profiles in accordance with yet another embodiment. In this embodiment, the automated apparatus has a drive wheel in contact with the upper surface of the airfoil-shaped body in proximity to the leading edge and has ball and socket bearings at the leading edge.

FIGS. 6A and 6B are diagrams showing some components of an adjustable automated apparatus for performing a maintenance operation which can be mounted on airfoil-shaped bodies 100 having different chord profiles in accordance with yet another embodiment. Although not shown in FIGS. 6A and 6B, this automated apparatus comprises: a chassis 31 configured to be mounted on the airfoil-shaped body 100; a carriage 42a translatably coupled to the chassis 31; and an end effector 48a pivotably coupled to the carriage 42a. The chassis 31 comprises a rocker mechanism 84 pivotably coupled to the frame 32. The rocker mechanism 84 comprises a rocker arm 86 and a shaft 54 having one end attached to the rocker arm 84. The rocker mechanism 84 further comprises a first ball and socket bearing 2g mounted to the rocker arm 86 on one side of the shaft 54, a motor 76 mounted to the rocker arm 52 on another side of the shaft 54, and a drive wheel 82 coupled to the motor 76. Although not shown in FIGS. 6A and 6B, the chassis 31 further comprises a second ball and socket bearing 2i mounted to the frame 32, as previously described with reference to FIG. 3. The frame 32 depicted in FIGS. 6A and 6B comprises: a connector beam 35 having opposing ends; an upper cantilever beam 36 having one end connected to one end of the connector beam 35; a lower cantilever beam 37 having one end connected to another end of the connector beam 35; and a transverse cantilever beam 33 (not shown in FIGS. 6A and 6B, but see FIG. 3) having one end supported by the upper cantilever beam 36. The rocker mechanism 50 is pivotably coupled to the upper cantilever beam 36, and the second ball and socket bearing 2i is mounted to the first transverse cantilever beam 33. The chassis 31 further comprises third and fourth ball and socket bearings 2a, 2b connected or mounted to the connector beam 35. Lastly, the frame 32 further comprises a cross beam 39 (not shown in FIGS. 6A and 6B, but see FIG. 3) supported by and extending in opposite directions away from the lower cantilever beam 37. The chassis 31 further comprises first and second spring-loaded ball and socket bearings 10a, 10b coupled to the cross beam 39 on opposite sides of the lower cantilever beam 37. Only the first spring-loaded ball and socket bearing 10a is visible in FIGS. 6A and 6B.

As seen in FIGS. 6A and 6B, the chassis 31 has numerous points of contact with the surfaces of the airfoil-shaped body 100 to ensure that the automated apparatus does not go off track. More specifically, the points of contact include at least the following: drive wheel 82, ball and socket bearings 2a, 2b and 2g, and spring-loaded ball and socket bearing 10a. In addition, the position of the center of mass of the automated apparatus can be adjusted by attaching a balance component 64 (not shown in FIGS. 6A and 6B) to the lower cantilever beam 37 in the manner previously described.

Figure 7:
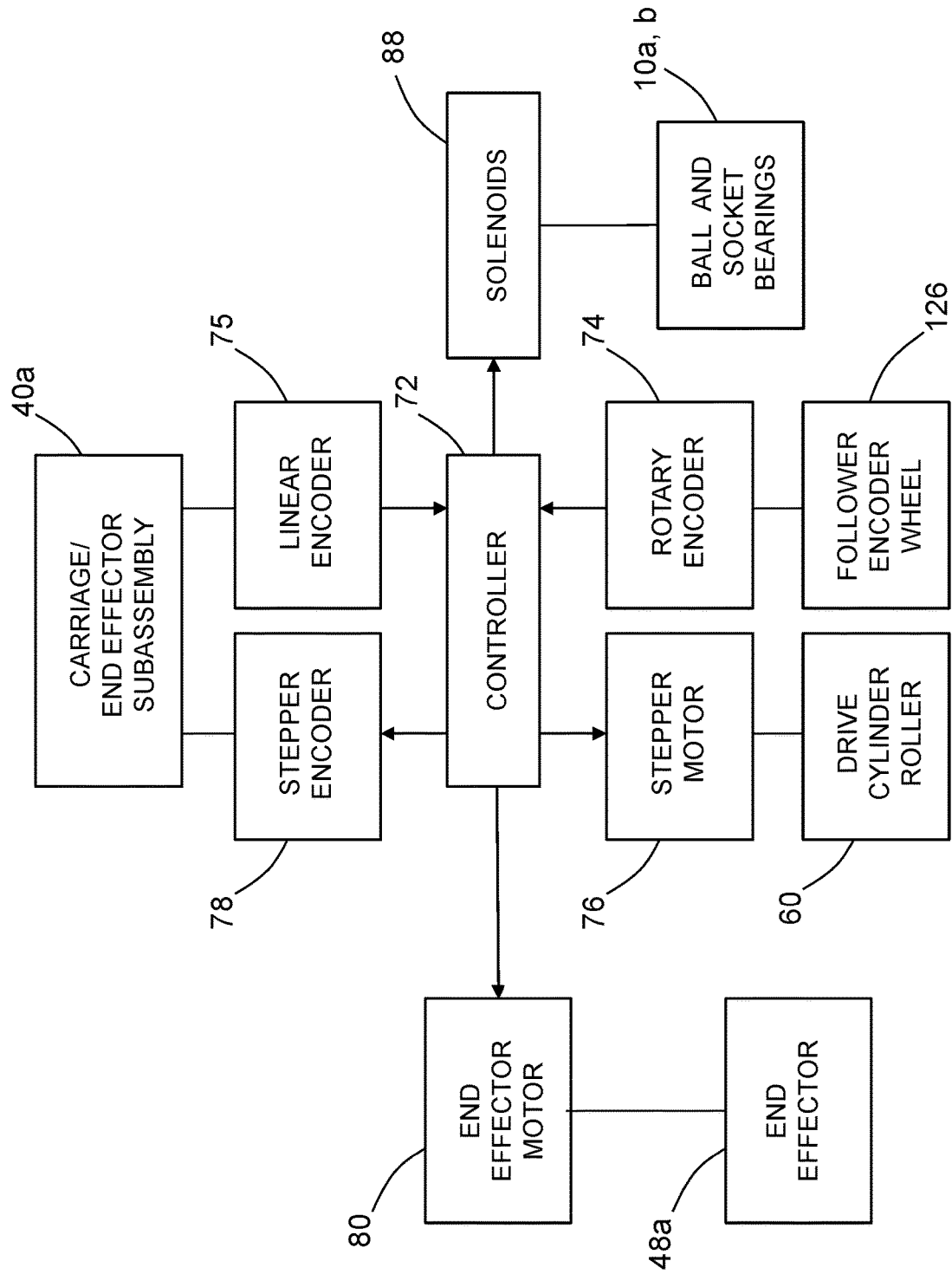
FIG. 7 is a block diagram identifying some components of a system comprising a computer for controlling a motorized chassis to travel in a spanwise direction and for controlling a motorized chassis-end effector subassembly to travel along the chassis in a chordwise direction during performance of a maintenance operation on an airfoil-shaped body.

FIG. 7 is a block diagram identifying some components of a system comprising a control computer (hereinafter "controller 72") for controlling a motorized chassis 31 to travel in a spanwise direction and for controlling a motorized chassis-end effector subassembly 42a to travel in a chordwise direction during performance of a maintenance operation on an airfoil-shaped body 100, such as a blade component. Various components of the system communicate with the controller 72, which may be located at an operations command center. The controller 72 may be connected to the automated apparatus 8 by an electrical cable (not shown in the drawings). Alternatively, the controller 72 and the automated apparatus 8 could communicate wirelessly.

The controller 72 controls the operations of a pair of stepper motors 76 and 78, which are mounted to the frame 32 of the automated apparatus 8. Stepper motor 76 drives rotation of the drive cylinder roller 60 during spanwise movement of the automated apparatus 8. Stepper motor 78 drives translation of the carriage-end effector subassembly 40a along the encoder rail 58a during chordwise movement of the end effector 48a. The controller 72 controls stepper motors 76 and 78 in dependence on crawler position information derived from respective encoders, as described in some detail below. The controller 72 also can send control signals for activating the solenoids 88 to extend or retract.

Although not shown in FIG. 3, the spanwise position of the chassis 31 may be tracked using a follower encoder wheel 70 that contacts the airfoil-shaped body 100 at some point other than the trailing edge 96 (which was the configuration disclosed in FIG. 1). More specifically, the follower encoder wheel 70 is oriented so that it rolls across the upper surface 90 of the airfoil-shaped body 100 during spanwise movement of the chassis 31. The spanwise position of the chassis 31 is measured by a rotary encoder 74 (see FIG. 7), which encodes incremental rotation of the follower encoder wheel 126. The rotary encoder 72 sends an encoder pulse to the operations control center (e.g., via an encoder cable or a wireless connection) after each incremental movement of the chassis 31 in the spanwise direction, which encoder pulses are used by the controller 72 to track the spanwise position of the chassis 31 and then control the stepper motor 76 accordingly.

In addition, the chordwise position of the carriage 42a relative to the upper cantilever beam 36 may be tracked using a linear encoder 75 (see FIG. 7). The chordwise position of the carriage 42a is measured by the linear encoder 75, which encodes incremental translation of the carriage 42a along the encoder rail 58a. The linear encoder 75 sends an encoder pulse to the operations control center (e.g., via an encoder cable or a wireless connection) after each incremental movement of the carriage 42a in the chordwise direction, which encoder pulses are used by the controller 72 to track the chordwise position of the carriage 42a and then control the stepper motor 78 accordingly.

Each linear encoder 75 comprises a reader head that moves along a linear encoder rail 58a having a measurement tape attached thereto. The measurement tape is readable by the reader head. The linear encoders may be optical or magnetic.

In accordance with one proposed implementation, an optical reader encoder of a well-known incremental type can be used. Such an optical reader head comprises a light source (e.g., an LED) and a photodetector array that detects any reference marks in its field of view at any instant in time. Incremental optical linear encoders typically output two quadrature signals (90 degrees out of phase) which are decoded to produce a count up pulse or a count down pulse. For decoding in software, the two quadrature signals are read by software, either via an interrupt on any edge or polling, and a state diagram lookup table is used to decode the direction of movement of the reader head.

In accordance with an alternative proposed implementation, magnetic linear encoders can be substituted for the optical linear encoders. Such magnetic linear encoders may be of a well-known incremental type. Such magnetic linear encoders comprise a differential magnetoresistive sensor which detects a magnetic signature of a magnetized scale, producing sine and cosine signals as it moves along the scale. These analog signals can then be interpolated internally to produce a range of resolutions.

In cases where the end effector 48a is a rotary tool (such as a scarfer, drill, deburrer or reamer), when the rotary tool reaches a target chordwise position, the controller 72 can be programmed to shut off the stepper motor 78 and then start an end effector motor 80, e.g., a drive motor which drives rotation of the rotary tool.

The controller 72 may also be programmed to control a cable management system (not shown). For example, motion control application software running on the control computer can control a cable motor of the cable management system. When the automated apparatus 8 is operated, one or more cables need to accompany the apparatus down the length of the airfoil-shaped body, e.g., a helicopter blade. The motion control software running on the controller 72 synchronizes the movement of the cables with the movement of the apparatus, extending or retracting the cables as appropriate. The controller 72 can be programmed to control the cable motor (not shown) in dependence on chassis position information derived from the rotary encoder 74.

The blade crawler disclosed herein can be adapted for use in the automation of various maintenance functions, including but not limited to nondestructive inspection, drilling, grinding, fastening, applique application, scarfing, ply mapping, depainting, cleaning and painting. There are a number of types of blade components on aircraft that will benefit from maintenance automation, including rotorcraft blades, propeller blades, flaps, ailerons, trim tabs, slats, stabilators and stabilizers.

Figure 8:
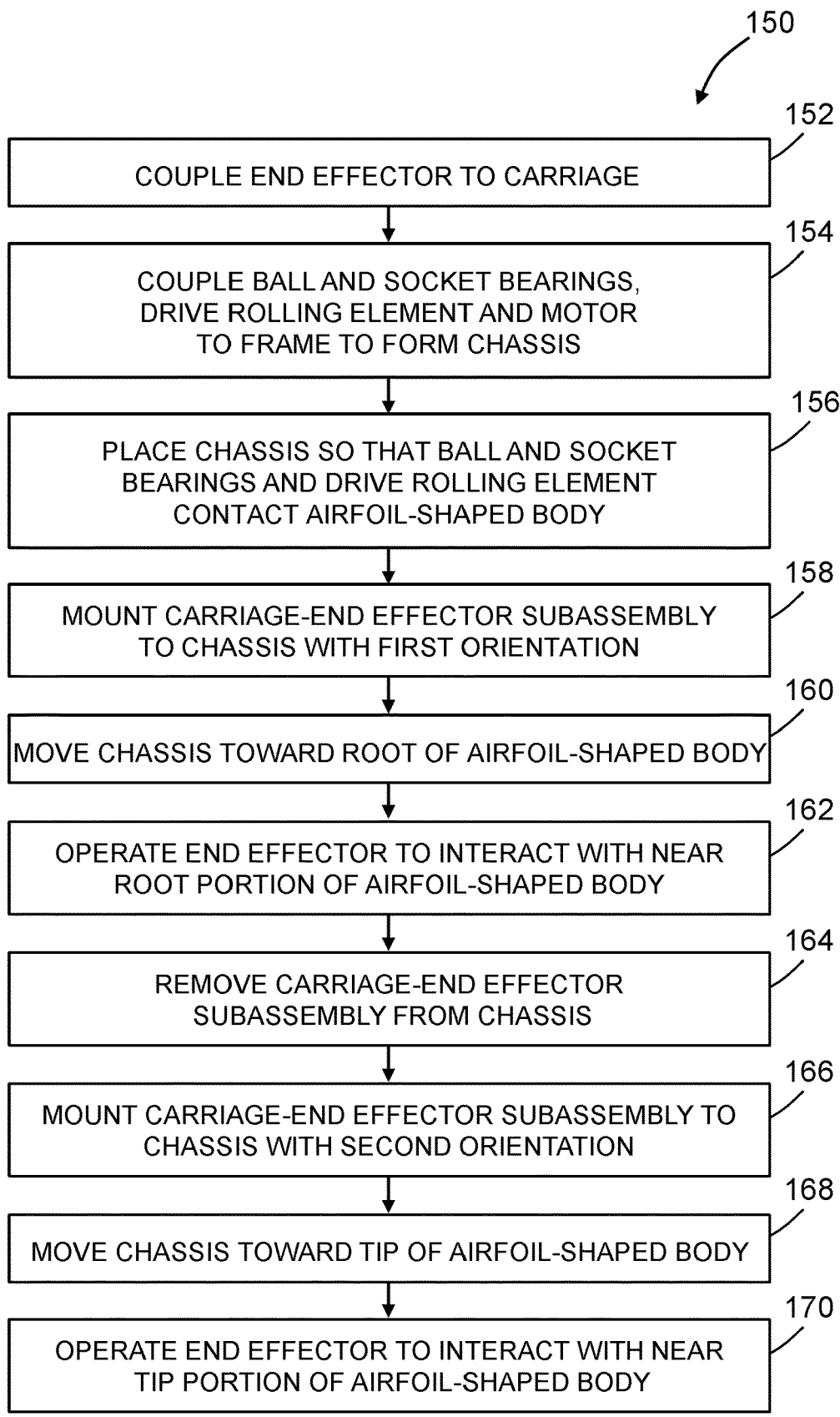
FIG. 8 is a flowchart identifying steps of a method in accordance with one embodiment for performing a maintenance procedure on an airfoil-shaped body using an automated apparatus.

FIG. 8 is a flowchart identifying steps of a method 150 in accordance with one embodiment for performing a maintenance procedure on an airfoil-shaped body 100 using an automated apparatus 8. First, the end effector 48a is coupled to the carriage 42a to form a carriage-end effector subassembly 40a (step 152). Then multiple ball and socket bearings 2a-2c, a drive rolling element (e.g., drive cylinder roller 60 or drive wheel 82) and a motor 76 are coupled to a frame 32 to form the chassis 31 (step 154). The drive rolling element is operatively coupled to rotate when the motor 76 is activated. The chassis 31 is then placed on the airfoil-shaped body 100 so that the multiple ball and socket bearings 2a-2c and the drive rolling element are in contact with the airfoil-shaped body 100 (step 156). With the chassis 31 in place, the carriage-end effector subassembly 40a is mounted to the chassis 31 with a first orientation (step 158). Then the chassis 31 is moved toward a root of the airfoil-shaped body 100 (step 160). The end effector 48a is operated to interact with a portion of the airfoil-shaped body 100 in a vicinity of the root of the latter (step 162). When that operation has been completed, the carriage-end effector subassembly 40a is removed from the chassis 31 (step 164). The carriage-end effector subassembly 40a is then re-mounted to the chassis 31 with a second orientation that differs from the first orientation by 180 degrees (step 166). The chassis 31 is then moved toward a tip of the airfoil-shaped body 100 (step 168). The end effector 48a is then operated to interact with a portion of the airfoil-shaped body 100 in a vicinity of the tip of the airfoil-shaped body (step 170).

While automated blade crawlers have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An automated apparatus for moving an end effector over an upper surface of an airfoil-shaped body, comprising: a chassis configured to be mounted on the airfoil-shaped body; a first carriage translatably coupled to the chassis and carrying a first reader head; and a first end effector pivotably coupled to the first carriage, wherein the chassis comprises:
   a frame comprising an upper cantilever beam to which the first carriage is translatably coupled, and a first encoder rail mounted to the upper cantilever beam and having a measurement tape which is readable by the first reader head;
   a drive cylinder roller rotatably coupled to the frame;
   a motor mounted to the frame and operatively coupled to cause the drive cylinder roller to rotate;
   a rocker mechanism pivotably coupled to the upper cantilever beam of the frame, the rocker mechanism comprising a rocker arm and a shaft having one end attached to the rocker arm;
   first and second ball and socket bearings mounted to the rocker arm on opposite sides of the shaft; and
   a third ball and socket bearing mounted to the frame.

2. The automated apparatus as recited in claim 1, wherein the frame comprises:
   a connector beam having opposing ends;
   an upper cantilever beam having one end connected to one end of the connector beam;
   a lower cantilever beam having one end connected to another end of the connector beam;
   a first cross beam supported by and extending in opposite directions away from the connector beam; and
   a first transverse cantilever beam having one end supported by the upper cantilever beam,
   wherein the drive cylinder roller is rotatably coupled to the first cross beam, the rocker mechanism is pivotably coupled to the upper cantilever beam, and the third ball and socket bearing is mounted to the first transverse cantilever beam.

3. The automated apparatus as recited in claim 2, wherein the frame further comprises a second transverse cantilever beam having one end supported by the upper cantilever beam, and the chassis further comprises a fourth ball and socket bearing mounted to the second transverse cantilever beam.

4. The automated apparatus as recited in claim 2, wherein the chassis further comprises a follower cylinder roller rotatably coupled to the first cross beam.

5. The automated apparatus as recited in claim 2, wherein the frame further comprises a second cross beam supported by and extending in opposite directions away from the lower cantilever beam; and the chassis further comprises first and second spring-loaded ball and socket bearings coupled to the second cross beam on opposite sides of the lower cantilever beam.

6. The automated apparatus as recited in claim 2, wherein the frame further comprises a second cross beam supported by and extending in opposite directions away from the lower cantilever beam; and the chassis further comprises first and second solenoids coupled to the second cross beam on opposite sides of the lower cantilever beam and comprising respective extendible/retractable plungers, and first and second ball and socket bearings mounted to the respective extendible/retractable plungers.

7. The automated apparatus as recited in claim 1, wherein the reader head is optical or magnetic.

8. The automated apparatus as recited in claim 1, further comprising a second carriage translatably coupled to the chassis and carrying a second reader head, and a second end effector pivotably coupled to the second carriage, wherein the frame further comprises a lower cantilever beam to which the second carriage is translatably coupled, and a second encoder rail mounted to the lower cantilever beam and having a measurement tape which is readable by the second reader head.

9. The automated apparatus as recited in claim 7, wherein the first carriage is mountable on the upper cantilever beam with first or second orientations that differ by 180 degrees, wherein the first end effector is disposed on one side of the upper cantilever beam when the first carriage is mounted on the upper cantilever beam with the first orientation and is disposed on another side of the upper cantilever beam when the first carriage is mounted on the upper cantilever beam with the second orientation.

10. The automated apparatus as recited in claim 1, further comprising a balance component coupled to the frame.

11. The automated apparatus as recited in claim 10, wherein the position of the point of coupling of the balance component to the frame is adjustable.

12. An automated apparatus for moving an end effector over an upper surface of an airfoil-shaped body, comprising: a chassis configured to be mounted on the airfoil-shaped body; a carriage translatably coupled to the chassis and carrying a reader head; and an end effector pivotably coupled to the carriage, wherein the chassis comprises:
   a frame comprising an upper cantilever beam to which the carriage is translatably coupled, and an encoder rail mounted to the upper cantilever beam and having a measurement tape which is readable by the reader head;
   a rocker mechanism pivotably coupled to the upper cantilever beam of the frame, the rocker mechanism comprising a rocker arm and a shaft having one end attached to the rocker arm;
   a first ball and socket bearing mounted to the rocker arm on one side of the shaft;
   a motor mounted to the rocker arm on another side of the shaft;
   a drive wheel coupled to the motor; and
   a second ball and socket bearing mounted to the frame.

13. The automated apparatus as recited in claim 12, wherein the frame comprises:
   a connector beam having opposing ends;
   an upper cantilever beam having one end connected to one end of the connector beam;
   a lower cantilever beam having one end connected to another end of the connector beam; and
   a transverse cantilever beam having one end supported by the upper cantilever beam,
   wherein the rocker mechanism is pivotably coupled to the upper cantilever beam, and the second ball and socket bearing is mounted to the first transverse cantilever beam.

14. The automated apparatus as recited in claim 13, wherein the chassis further comprises third and fourth ball and socket bearings connected or mounted to the connector beam.

15. The automated apparatus as recited in claim 13, wherein the frame further comprises a cross beam supported by and extending in opposite directions away from the lower cantilever beam, and wherein the chassis further comprises first and second spring-loaded ball and socket bearings coupled to the cross beam on opposite sides of the lower cantilever beam.

16. The automated apparatus as recited in claim 13, further comprising a balance component coupled to the lower cantilever beam.

17. The automated apparatus as recited in claim 16, wherein the position of the point of coupling of the balance component to the lower cantilever beam is adjustable.

18. An automated apparatus for moving an end effector over an upper surface of an airfoil-shaped body, comprising: a chassis configured to be mounted on the airfoil-shaped body; a carriage translatably coupled to the chassis and carrying a reader head; and an end effector pivotably coupled to the carriage, wherein the chassis comprises:

a frame comprising an upper cantilever beam to which the carriage is translatably coupled, and an encoder rail mounted to the upper cantilever beam and having a measurement tape which is readable by the reader head;

a rocker mechanism pivotably coupled to the upper cantilever beam of the frame, the rocker mechanism comprising a rocker arm and a shaft having one end attached to the rocker arm;

a first ball and socket bearing mounted to the rocker arm on one side of the shaft; and a second ball and socket bearing mounted to the frame.

19. The automated apparatus as recited in claim 18, further comprising:

a drive cylinder roller rotatably coupled to the frame;

a motor mounted to the frame and operatively coupled to cause the drive cylinder roller to rotate; and a third ball and socket bearing mounted to the rocker arm on an opposite side of the shaft.

20. The automated apparatus as recited in claim 18, further comprising:

a motor mounted to the rocker arm on an opposite side of the shaft; and a drive wheel coupled to the motor.

* * * * *